United States Patent [19]

Kondo

[11] 3,953,867
[45] Apr. 27, 1976

[54] ELECTROMAGNETIC OPERATING CIRCUIT FOR CAMERAS

[75] Inventor: Toshihiro Kondo, Chofu, Japan

[73] Assignees: Toshihiro Kondo, Tokyo, Japan; Fuji Photo Film Co., Ltd., Japan

[22] Filed: Mar. 13, 1975

[21] Appl. No.: 557,987

[30] Foreign Application Priority Data
Mar. 16, 1974 Japan............................... 49-30261

[52] U.S. Cl.................................. 354/51; 354/50; 354/60 R; 354/234; 354/235; 354/258; 317/151

[51] Int. Cl.² ...................... G03B 7/08; G03B 9/62; G03B 9/64

[58] Field of Search............. 354/50, 51, 60 R, 234, 354/235, 258; 317/DIG. 6, 137, 139, 140, 151

[56] References Cited
UNITED STATES PATENTS

| | | | |
|---|---|---|---|
| 3,063,354 | 11/1962 | Matulik et al. | 354/51 |
| 3,444,794 | 5/1969 | Wasielewski et al. | 354/51 |
| 3,466,993 | 9/1969 | Fahlenberg et al. | 354/235 |
| 3,581,647 | 6/1971 | Moronde | 354/235 |
| 3,687,027 | 8/1972 | Watanabe et al. | 354/50 |
| 3,742,827 | 7/1973 | Wissz et al. | 354/50 |
| 3,791,278 | 2/1974 | Biber et al. | 354/235 |

Primary Examiner—L. T. Hix
Assistant Examiner—Russell E. Adams, Jr.
Attorney, Agent, or Firm—Fleit & Jacobson

[57] ABSTRACT

Capacitors are connected in parallel with a power source. Each capacitor is connected in parallel with an electromagnetic coil by way of a switch. At least one but not all of said coils are connected in parallel with an RC time constant circuit so that the energization thereof may be delayed thereby. All switches are simultaneously closed and the coils are energized in the order determined by the time constants of the time constant circuits connected therewith. Between adjacent capacitors are connected diodes which prevent the capacitors connected with coils to be energized later from discharging through the coils to be energized earlier.

8 Claims, 4 Drawing Figures

ELECTROMAGNETIC OPERATING CIRCUIT FOR CAMERAS

BACKGROUND OF THE INVENTION

1. Field of the Invention

This invention relates to an electromagnetic operating circuit for a camera, and more particularly to a circuit which has electromagnetic coils for operating mechanical members in a photographic camera which has an electrically controlled shutter or diaphragm.

2. Description of the Prior Art

It has been known in the art to provide an electrically controlled shutter or diaphragm in a camera. It is, however, difficult to provide a large electric power source in the camera since the space within the camera body is limited. Therefore, the electrical shutter control means employed in the conventional automatic exposure control camera is driven by a mechanical force of spring or the like and the charged mechanical force thereof is released by a mechanical release member which is electromagnetically driven. The force required to electromagnetically operate the release member is comparatively small. Thus, a large mechanical force can be obtained by a small electromagnetic force.

Even in the above described camera, however, in which the mechanical force of a charged spring is released by the action of an electromagnetic force, a transmitting mechanism for transmitting the mechanical force of the spring to the mechanically operated elements must be provided in the camera body. The mechanical force transmitting mechanism makes the camera structure complicated and raises the production cost of the camera.

SUMMARY OF THE INVENTION

In view of the above mentioned shortcomings of the conventional camera, the primary object of the present invention is to provide an electromagnetic operating circuit for a camera which provides a large electromagnetic driving force by use of only a small power source that occupies little space in the camera body.

Another object of the present invention is to provide an electromagnetic operating circuit for a camera which is capable of driving an exposure control member at a high speed.

Still another object of the present invention is to provide an electromagnetic operating circuit for a camera which can be used in conjunction with a simplified mechanical structure within the camera.

A further object of the present invention is to provide an electromagnetic operating circuit for a camera which makes it possible to manufacture a camera having an electromagnetic exposure control means at a markedly lower cost.

The electromagnetic operating circuit in accordance with the present invention is characterized in that a large amount of electric current is caused to flow through electromagnetic coils by a small electric power source. Since a large amount of current flows through the coils, great electromagnetic power can be obtained without enlarging the size of the coils.

In accordance with the present invention, a plurality of capacitors are connected in parallel with a D.C. source and each capacitor is connected with a coil by way of a switch. Upon closure of the switches, the capacitors are instantly discharged so that a great amount of current flows through the coils. Between each pair of adjacent capacitors are connected diodes so that the electric charge of a capacitor connected with a closed switch can be prevented from passing to the adjacent capacitor or the coil connected with the adjacent capacitor connected with an opened switch.

PREFERRED EMBODIMENTS OF THE INVENTION

Figure 1:
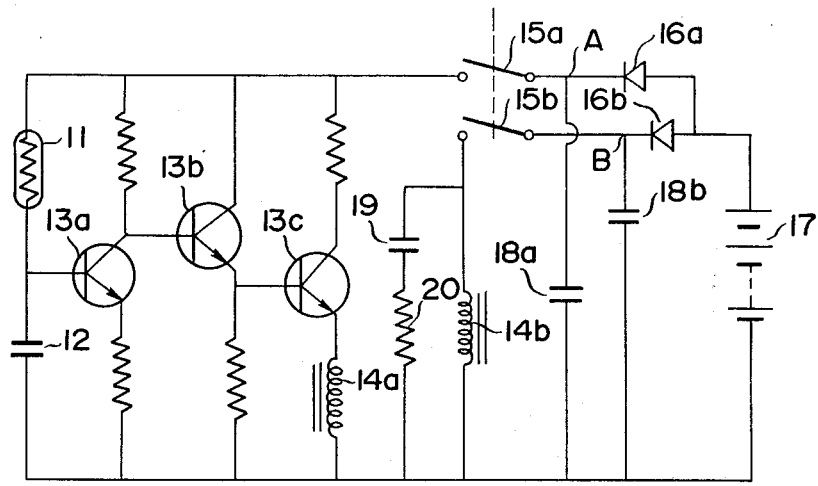
FIG. 1 is an electric circuit view showing an embodiment of the present invention wherein two capacitors and two coils are employed.

Now referring to FIG. 1 which shows an electric shutter circuit for automatic exposure control in accordance with a preferred embodiment of the present invention, a cadmium sulfide or other photoconductive type photodetector 11 and a capacitor 12 connected in series therewith are connected across a source 17 to constitute an RC time constant circuit which determines a time constant in accordance with the scene brightness. The connecting point between the photoconductor 11 and the capacitor 12 is connected with the base of a first transistor 13a. The first transistor 13a, a second transistor 13b the base of which is connected with the collector of the first transistor 13a and a third transistor 13c the base of which is connected with the emitter of the second transistor 13b constitute a multi-step amplifier to amplify the output of the RC time constant circuit 11 and 12. A shutter closing coil 14a is connected with the emitter of the third transistor 13c. Between the third transistor 13c and the source 17 are connected in series a first switch 15a and a first diode 16a. The first switch 15a is closed when the shutter is to be closed. A first capacitor 18a is connected between the source 17 and the connecting point A between the first switch 15a and the first diode 16a so that the first capacitor 18a is charged by the source 17 while the first switch 15a is opened and discharges through the shutter closing coil 14a after a time determined by the RC time constant circuit 11 and 12 lapses from the closing of switch 15a. A shutter opening coil 14b is connected with the source 17 by way of a second switch 15b and a second diode 16b connected in series therewith. Between the source 17 and the connecting point B between the second switch 15b and the second diode 16b is connected a second capacitor 18b so that the second capacitor 18b is charged by the source 17 while the second switch 15b is opened. Further, a capacitor 19 and a resistor 20 connected in series therewith to form an RC time constant circuit are connected in parallel with the shutter opening coil 14b so that the charge of the second capacitor 18b will discharge through the shutter opening coil 14b after a time determined by the time constant circuit 19 and 20 lapses from the closing of the second switch 15b. The capacitor 19 is provided for delaying the energization of the shutter opening coil 14b to insure that the shutter will open only after the mechanism for preparing the shutter release has been completely operated, e.g., a swing-up mirror has completely been swung up or a diaphragm has completely been set to provide a proper aperture.

Said first diode 16a is provided for the purpose of preventing the charge of the first capacitor 18a for operating the shutter closing coil 14a from discharging through the shutter opening coil 14b when the second switch 15b is closed together with the first switch 15a. Said second diode 16b is provided for the purpose of preventing the charge of the second capacitor 18b from discharging through the shutter closing coil 14a when the switches 15a and 15b are closed. However, since the second capacitor 18b is discharged to operate the shutter opening coil 14b before the shutter closing coil 14a is energized, no problem will occur even if there should some remaining charge in the second capacitor 18b which discharges through the shutter closing coil 14a after the first switch 15a is closed. Therefore, the second diode 16b need not necessarily be employed in the circuit. It will be understood, however, that the second diode 16b should preferably be provided for effectively utilizing the charge of the second capacitor 18b to energize the shutter opening coil 14b.

In the above described power source circuit, the first and second switches 15a and 15b are simultaneously closed upon depression of a shutter release member (not shown). Upon closure of the switches 15a and 5b, charging of the capacitor 19 begins and after the lapse of the time determined by the capacity of the capacitor 19 a large amount of electric current flows from the second capacitor 18b into the shutter opening coil 14b to open shutter blades of a lens shutter or start the leading shutter blade of a focal plane shutter. Since the amount of electric energy stored in the second capacitor 18b is large, a great electromagnetic force can be generated by the shutter opening coil 14b. This electromagnetic force can be used, for instance, to directly rotate a shutter blade driving ring. The time which lapses between the closing of the second switch 15b and the energizing of the coil 14b is precisely determined by the capacity of the capacitor 19 and the resistance of the resistor 20 connected in series therewith to form an RC time constant circuit.

Thereafter, when the time determined by said RC time constant circuit constituted of the photodetector 11 and the capacitor 12 has lapsed after the closing of switch 15a, the third transistor 13c is turned on to let current flow through the shutter closing coil 14a. Since the resistance of the photodetector 11 is determined by the scene brightness detected thereby, said time varies in accordance with the scene brightness. Therefore, the shutter closing coil 14b is energized to close the shutter blades of a lens shutter or start the trailing shutter blade of a focal plane shutter to expose the film in the camera for a proper exposure time corresponding to the scene brightness. Since the amount of electric energy stored in the first capacitor 18a is large, a great electromagnetic force can be generated by the shutter closing coil 14a. The electromagnetic force can be used for instance, to directly rotate a shutter blade driving ring.

As described above, in accordance with the electromagnetic operating circuit of the present invention, a great electromagnetic force can be obtained by use of comparatively small electric power source. Therefore, shutter blades can be operated without using the mechanical force of springs or the like, and accordingly, the mechanical structure within the automatic exposure control camera can be markedly simplified and the manufacture thereof facilitated. In addition, since a great electromagnetic force can be obtained, an element in the camera can be driven at a high speed and high shutter speeds can be obtained.

Although the present invention has been described with particular reference to an embodiment wherein two coils are employed in connection with two capacitors, it will be understood that the present invention can be effected with more than two coils and capacitors. When more than two coils and capacitors are employed, diodes corresponding to said first diode connected between the first and second capacitors must be connected between the second and third capacitors and so forth. For example, it is possible and preferable in some cases to employ three coils the first of which is used to swing up a mirror between the taking lens and the film, the second of which is used to open the shutter and the third of which is used to close the shutter.

Figure 2:
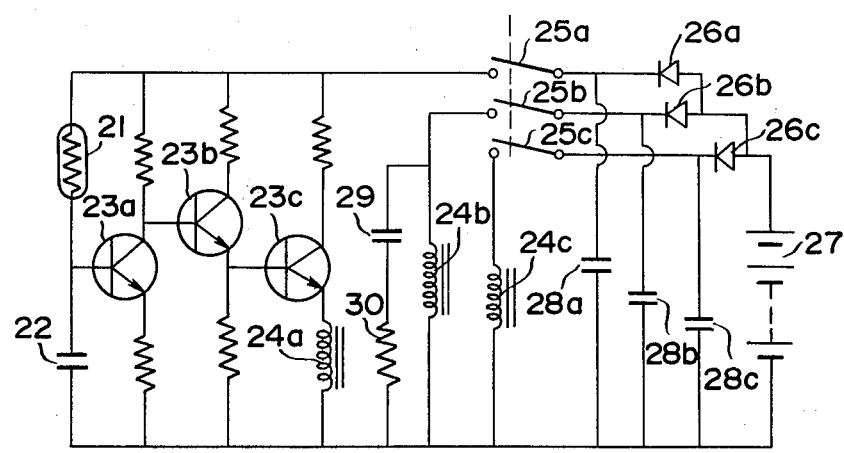
FIG. 2 is an electric circuit view showing another embodiment of the present invention wherein three capacitors and three coils are employed.

One example of the circuit wherein three coils and capacitors are employed is shown in FIG. 2. In FIG. 2, all elements corresponding to those shown in FIG. 1 are designated by like reference numerals, wherein the reference numerals in FIG. 2 indicating the elements corresponding to those shown in FIG. 1 are greater than those in FIG. 1 by 10 in number. For instance, the shutter closing coil in FIG. 2 corresponding to that shown in FIG. 1 by 14a is indicated by 24a. The third coil 24c connected with the third capacitor 28c by way of the third switch 25c is used to swing up a mirror and set a diaphragm in the camera. Upon closure of the switches 25a, 25b and 25c in this embodiment, the third coil 24c is first energized to swing up the mirror and set the diaphragm, and then after the lapse of the time determined by the capacity of the capacitor 29 and the resistance of the resistor 30 connected therewith the second coil 24b is energized to open the shutter, and finally after the lapse of the time determined by the RC time constant circuit 21 and 22 the first coil 24a is energized to close the shutter.

Although the above described two embodiments of the invention employ a photoconductive type photodetector 11 and 21 such as a cadmium sulfide element, it will be understood that the photoconductive type photodetector can be replaced by a photovoltaic type photodetector such as a silicon blue cell. One example of the circuit employing the photovoltaic type photodetector is shown in FIG. 3.

Figure 3:
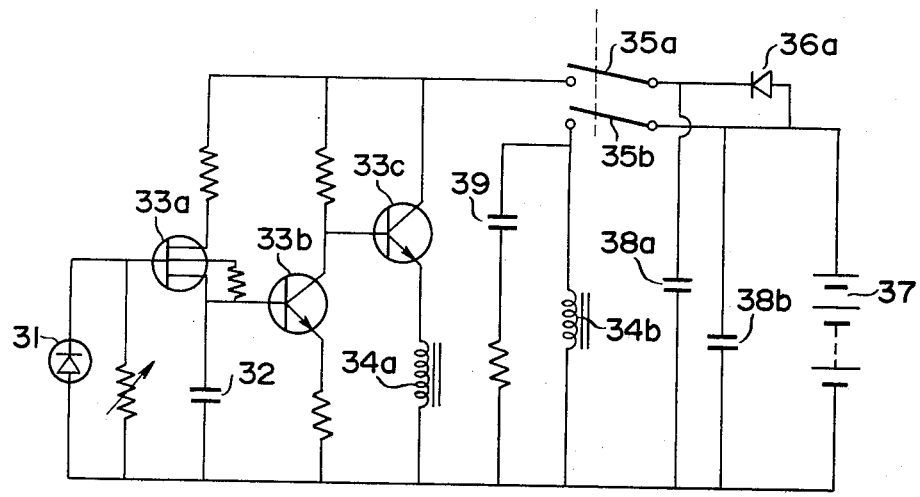
FIG. 3 is an electric circuit view showing still another embodiment of the present invention wherein a silicon blue cell is employed as a photodetector.

Referring to FIG. 3 in which elements corresponding to those employed in the above embodiments shown in FIGS. 1 and 2 are indicated by like numerals, a field effect transistor 33a is connected with the photovoltaic type photodetector 31 as well kown in the art. Since the operation of the circuit as shown in FIG. 3 will be apparent to those skilled in art in view of the like circuits shown in FIGS. 1 and 2, detailed description thereof will be omitted here. A second diode corresponding to said second diodes 16b and 26b of the former embodiments to be connected between the second capacitor 38b and the power source 37 is eliminated in this embodiment.

Further, it will be understood that the transistors employed in the former embodiments can be replaced by thyristors. One example of the circuit which employs thyristors as switching means is shown in FIG. 4.

Figure 4:
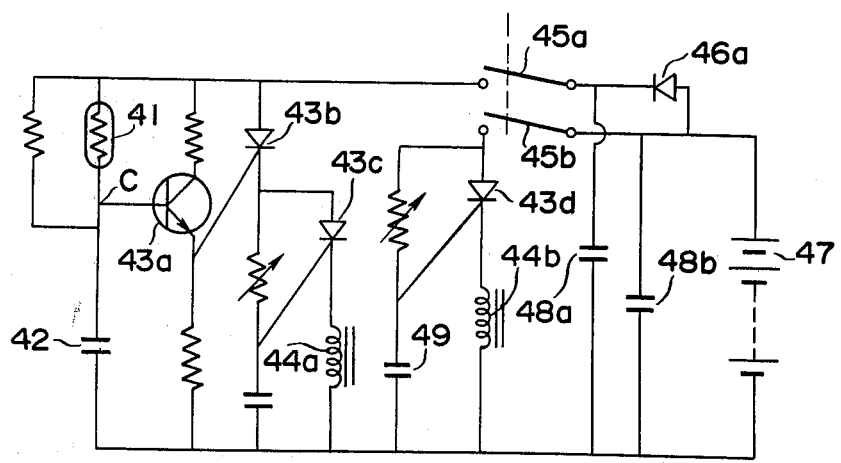
FIG. 4 is an electric circuit view showing a further embodiment of the present invention wherein thyristers are employed instead of transistors employed in the above embodiments.

Referring to FIG. 4 in which elements corresponding to those employed in the former embodiments shown in FIGS. 1, 2 and 3 are indicated by like numerals, a first thyristor 43b is connected with the emitter of the first transistor 43a which in turn is connected with the connecting point C between a photodetector 41 and a capacitor 42. A second thyristor 43c is connected with the first thyristor 43b, and the shutter closing coil 44a is connected with the second thyristor 43c so that the shutter closing coil 44a may be energized when the second thyristor 43c is turned on. The embodiment shown in FIG. 4 is provided with a third thyristor 43d which is connected between the shutter opening coil 44b and the second switch 45b corresponding to the second switches 15b, 25b and 35b. The gate of the third thyristor 43d is connected with a capacitor 49 connected in parallel with the shutter opening coil 44b so that the third thyristor 43d may be turned on to make current flow into the shutter opening coil 44b when the capacitor 49 is charged. Since it will be apparent to those skilled in the art that the circuit shown in FIG. 4 operates similarly to the circuits shown in FIGS. 1, 2 and 3, a detailed description of the operation thereof is omitted here.

It will be understood that the coils are not limited to open or close the shutter blades of the camera but may be used for driving various elements operable in the camera.

What is claimed is:

1. An electromagnetic operating circuit for a camera comprising in combination;

a direct current power source, a plurality of capacitors connected in parallel with said power source to be charged thereby, a plurality of electromagnetic coils, each of said coils being connected with at least one of said capacitors to be energized by the discharge current of the capacitor connected therewith, at least one delay circuit connected with at least one of said coils for delaying the energization of the coil, a plurality of normally opened switching means one of which is connected between each said coil and said capacitors connected therewith, a manual operating means provided in the camera to be manually operated to energize said coils, said switching means being closed to energize said coils upon operation of said manual operating means, and at least one diode connected between said capacitors for preventing current discharged from one capacitor from flowing into the coil connected with another capacitor when said switching means is closed.

2. An electromagnetic operating circuit for a camera as claimed in claim 1 wherein said at least one delay circuit is a time constant circuit comprising a photodetector to detect the scene brightness, a capacitor connected in series therewith, and an amplifier connected with the connecting point between the photodetector and the capacitor connected therewith.

3. An electromagnetic operating circuit for a camera as claimed in claim 2 wherein said photodetector is a photoconductive type photodetector.

4. An electromagnetic operating circuit for a camera as claimed in claim 2 wherein said photodetector is a photovoltaic type photodetector.

5. An electromagnetic operating circuit for a camera as claimed in claim 2 wherein said coil connected with said delay time constant circuit is associated with a shutter closing means and another coil which is not connected with said time constant circuit is associated with a shutter opening means.

6. An electromagnetic operating circuit for a camera as claimed in claim 5 wherein said coil associated with said shutter opening means is connected in parallel with a delay circuit.

7. An electromagnetic operating circuit for a camera as claimed in claim 6 wherein said delay circuit connected with said coil associated with a shutter opening means comprises a capacitor and a resistor connected in series therewith.

8. An electromagnetic operating circuit for a camera as claimed in claim 1 wherein said normally opened switching means are closed simultaneously upon operating of said manual operating means.

* * * * *